Jan. 2, 1951  J. F. HINRICHS  2,536,934
DISSOLVING APPARATUS
Filed Dec. 23, 1946
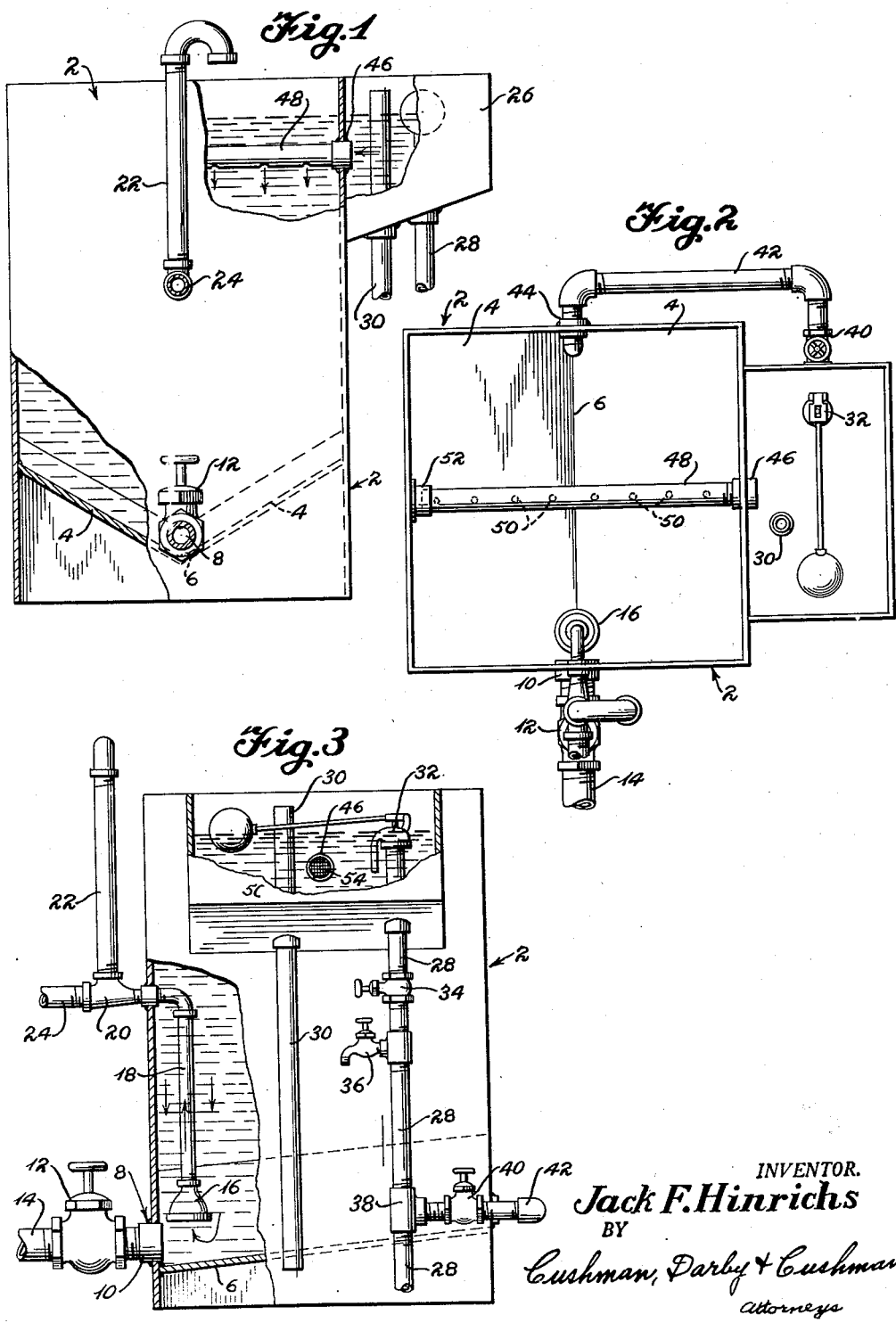
INVENTOR.
Jack F. Hinrichs
BY
Cushman, Darby & Cushman
Attorneys Patented Jan. 2, 1951

2,536,934

UNITED STATES PATENT OFFICE 2,536,934

DISSOLVING APPARATUS

Jack F. Hinrichs, Houston, Tex., assignor to Toland-Hinrichs Company, Houston, Tex., a partnership consisting of L. P. Toland and Jack F. Hinrichs Application December 23, 1946, Serial No. 717,825

2 Claims. (Cl. 23—272)

1

This invention relates to improvements in dissolving apparatus and is particularly concerned with apparatus for dissolving water soluble salts, such as common rock salt, to produce brines or solutions of high salt concentration.

A principal object of this invention is the provision of new improvements in apparatus for dissolving water soluble salts, particularly rock salt. Further objects include the provision of this type of apparatus which is (1) Capable of producing a highly concentrated brine solution from rock salt at substantially uniform rates for extended periods of time without interruption;

(2) Capable of producing brine solutions which are clear and not contaminated by undissolved particles, i. e., capable of separating insoluble and undissolved matter from the brine solution without clogging of the apparatus;

(3) Capable of being cleaned out in an extremely short time and in a very simple fashion;

(4) Capable of dispersing water upon the salt to be dissolved under pressure of a substantially constant hydrostatic head.

Further objects and the entire scope of applicability of the present invention will become apparent from the detailed description given hereinafter.

These objects are accomplished according to the present invention by the provision of a new dissolving method and new dissolving apparatus, a specific embodiment of which is illustrated in the accompanying drawing, wherein Figure 1 is a front elevational view partly in section of my improved apparatus;

Figure 2 is a top view of the apparatus;

Figure 3 is a side elevational view partly in section of the apparatus.

Referring in detail to the drawing, the apparatus comprises a tank 2 for holding the salt to be dissolved. The tank is provided with a trough-shaped bottom made up of two intersecting planes 4 which intersect along the line 6. The line of intersection of the two inclined plane bottoms of the tank is sloped at an angle of about 5° from the horizontal slopes toward the front of the apparatus, i. e., the lower part of the bottom is at the front.

The tank is provided with a drain 8 which consists of a short piece of pipe or pipe nipple 10, a valve 12, and a further section of pipe 14 which may be connected, if desired, to the sewer.

The salt solution or brine outlet consists of a funnel-shaped element 16, and a section of pipe 18 which has a bend at the upper end and which

2 passes through the side of the tank 2 at a point intermediate between the top of the liquid level in the tank and the bottom of the tank. The end of the pipe 18 which passes through the side of the tank is connected by means of a T-section 20 to a vent pipe 22 and a salt solution conveying pipe 24. The vent pipe 22 is provided to prevent any air pocket from building up in the pipes 24 and 18 and, thus, safeguard against stoppage of the solution flow where the flow of the salt solution through the pipe 24 is caused by the hydrostatic head in the tank 2. If desired, the pipe 24 may be connected to suitable pumping means (not shown), in order to pump the brine formed in the apparatus from the tank.

The funnel-shaped end 16 on the brine outlet is open at its lower, widest end. As will be seen, the lower end of the funnel-shaped element 16 is positioned immediately above the tank drain 8 at the lower end of the tank bottom.

A fresh water storage chamber 26 is attached to the side of the tank 2. The chamber 26 is provided with a fresh water inlet 28 and an overflow 30. At the top of the fresh water inlet 28 is a float-controlled valve 32. The fresh water inlet line 28 is provided with a valve 34, a spigot 36 and a T-section 38, which is connected to valve 40. The valve 40 is connected at the other end to a pipe 42 which, in turn, is connected at 44 to the tank 2 at the upper end of the trough-shaped bottom.

The side of the tank 2, which is common with the fresh water storage chamber 26, is provided with an opening 46. A fresh water disperser 48, consisting of a straight section of pipe having a plurality of holes 50 in the lower side thereof, is connected to the opening 46. The opposite end of the pipe 48 is firmly held to the tank 2 by means of the brace or pipe holder 52. The opening 46 is preferably provided with a screen 54, as can be seen in Figure 3.

The manner in which a water soluble salt is dissolved and formed in a concentrated solution in my apparatus is as follows:

The tank 2 is first filled with a desired grade of rock salt. With the valves 12, 34, 40 and the spigot 36 closed, water is passed into the chamber 26 through the water supply line 28. So long as the water in the chamber 26 is below a predetermined level, the float valve 32 will permit the water to enter the chamber, but should the height of the water in the chamber 26 exceed this level, further water is prevented from entering the apparatus by means of the float valve.

When the water in the chamber 26 has reached the height of the opening 46, the water will flow into the ported tube 48 and be discharged through the openings 50 into the salt bed contained in the tank 2. Thus, the water percolates down over the rock salts through the voids under a pressure of a substantially constant, low, hydrostatic head.

As the water passes down through the apparatus, it becomes saturated with salt forming a concentrated brine solution. The saturated brine then passes out of the tank through the funnel-shaped opening 16, the pipe 18 and finally pipe 24 to the point of use or storage.

In the event that due to mechanical failure the float valve fails to shut off the water entering the apparatus through the line 28, the excess water will pass out into the sewer through the overflow 30.

As is well known, substantially all commercial varieties of rock contain considerable quantities of water insoluble materials, such as sand and the like. The relationship of the trough-shaped bottom and the funnel-shaped opening 16 in my apparatus permits this undissolved matter to collect on the bottom of the apparatus and to be undisturbed by the outflow of saturated brine. Thus, the large opening in the funnel-shaped brine collector 16, which tapers to the small connecting end, permits the brine to flow from the tank without production of any turbulent currents which would cause the insoluble matter resting on the tank bottom to be agitated and to be entrained in the outgoing brine solution.

The accumulated residue in the tank must be cleaned out from time to time. The apparatus of this invention provides excellent facilities for accomplishing this operation.

Cleaning out is accomplished as follows: All the liquid in the tank is first removed by opening the drain valve 12. A short section of rubber hose is then connected to the faucet 36 and the opposite end of the hose is connected to the open end of the vent line 22. With the valve 34 closed and the faucet 36 open, water is forced through the inlet line 28 so that it flows through the rubber hose attached to 36 and line 22 and finally enters the tank 2 by way of the funnel-shaped element 16. The wash water enters the tank 2 through the element 16 in a state of turbulent agitation or swirling motion which constantly agitates the residue in the tank at the lower end of the bottom near the drain 8. With the water flowing into the tank through the element 16, the valve 40 is opened so as to permit wash water to rush into the top part of the trough-shaped bottom at the back of the tank 2 through the opening 44. This rush of water through the opening 44 proceeds with full force along the entire surfaces 4 of the tank bottom. This combination of water wash from the back of the tank and agitation at the mouth of the drain both combine to sweep all of the residue out of the tank into the sewer.

I claim:

1. A salt dissolving apparatus which comprises a rectangular tank having a V-bottom sloped from rear to front with the apex thereof centrally located, a side entering drain pipe located at the front end of the tank adjacent the bottom apex, a side entering flushing water inlet tube located at the back end of the tank adjacent the bottom apex, a side entering pipe extending downwardly within the tank connected at its lower end to the small end of a funnel-shaped element, said funnel-shaped element being located at the front side of the tank with the wide opening of the element positioned immediately above the inlet to said drain pipe, a chamber attached to the side of the tank, a ported tube located in the upper portion of the tank with an open end connected to said chamber for fluid flow through an aperture in the tank side, a water inlet into said chamber, and a float-controlled valve on said water inlet positioned on a level above said ported tube.

2. Apparatus as claimed in claim 1, wherein said side entering pipe connects to a T located externally of said tank, a brine delivery line being connected to one outlet of the T and vent pipe extending above the top of said tank being connected to the other outlet of said T.

JACK F. HINRICHS.

REFERENCES CITED

The following references are of record in the file of this patent:

UNITED STATES PATENTS

| Number | Name | Date |
| --- | --- | --- |
| 72,290 | Hall | Dec. 17, 1867 |
| 1,439,061 | Broadbridge | Dec. 19, 1922 |
| 1,572,023 | Lathrop et al. | Feb. 9, 1926 |
| 1,625,198 | Eisenhauer | Apr. 19, 1927 |
| 1,759,601 | Apeldorn | May 20, 1930 |
| 1,789,314 | Lindsay | Jan. 20, 1931 |
| 1,928,008 | Courthope | Sept. 26, 1933 |
| 2,173,986 | Stuart | Sept. 26, 1939 |
| 2,280,466 | Black | Apr. 21, 1942 |